Sept. 10, 1940.  A. L. KRONQUEST  2,214,422
SHEET METAL CAN BODY BLANK
Filed June 8, 1937
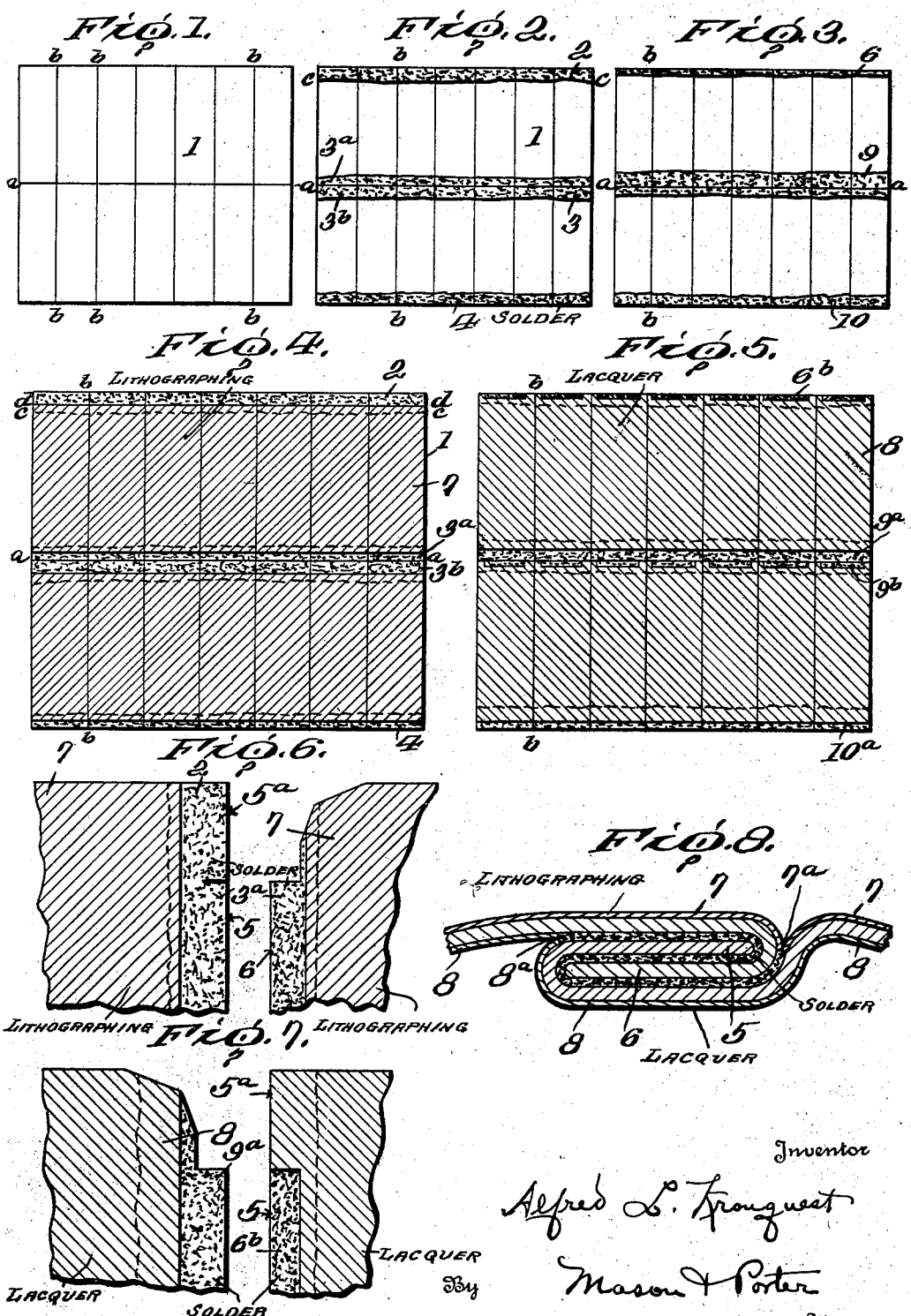
Inventor
Alfred L. Kronquest
By Mason & Porter
Attorneys Patented Sept. 10, 1940

2,214,422

UNITED STATES PATENT OFFICE 2,214,422

SHEET METAL CAN BODY BLANK

Alfred L. Kronquest, Syracuse, N. Y., assignor to Continental Can Company, Inc., New York, N. Y., a corporation of New York Application June 8, 1937, Serial No. 147,095

1 Claim. (Cl. 220—62)

The invention relates to a can body blank used in the making of can bodies having a soldered bonded side seam.

An object of the invention is to provide a can blank for the making of can bodies, which can body blank consists of black plate coated with solder along the parallel margins constituting the side seam portions, and with a non-metallic coating on the exterior of the body blank which overlaps the solder coating throughout the length of the side seam portions, and wherein the limits of the non-metallic coating are defined by straight lines.

These and other objects will in part be obvious and will in part be hereinafter more fully disclosed.

In the drawing which shows by way of illustration the preferred steps used in the making of applicant's improved body blank—

Figure 1 is a plan view of a sheet of metal from which the body blanks are to be formed and indicating by light lines where the sheet is to be cut to form the body blanks;

Fig. 2 is a view similar to Fig. 1, showing solder strips applied to the face of the sheet which is to form the outer surface of the can body;

Fig. 3 is a view similar to Fig. 2, but showing the solder strips as applied to the face of the sheet which is to form the inner surface of the can body;

Fig. 4 is a view similar to Fig. 2, but showing the sheet as lithographed or coated with a non-metallic coating;

Fig. 5 is a view similar to Fig. 3, but showing the sheet as coated with a lacquer;

Fig. 6 is a view on an enlarged scale showing the edge portions provided with the usual notches and slits for forming the hooks, as viewed from the outside;

Fig. 7 is a similar view from the inside of the can blank before the hooks are formed and interlocked, and Fig. 8 is an enlarged sectional view through the side seam in the region of the interlocked hooks.

The invention has to do with the making of can bodies and is particularly applicable to the making of can bodies from "black plate," that is, sheets of steel which are not coated with metal. It will be understood, however, that the invention may be applied to the making of can bodies from tin plate or black sheets coated with other metals. The sheet which is to be cut into body blanks is subjected to a suitable fluxing and solder applying devices for forming a strip coating of solder on the plate. This coating of solder is applied to the edge portions of each blank which are to be joined in the forming of the side seam of the can body. After the sheet has been coated with the solder in the manner described, then the face of the sheet which is to constitute the outer surface of the can body is lithographed and decorated in a manner desired for the finish coating of the can body. This lithographing laps on to the solder strips so that the surface of the black plate is completely covered with the solder coating and the lithographing applied thereto. Likewise, the face of the sheet which is to constitute the inner surface of the can body is lacquered and the coating of lacquer laps on to the solder strips so that the inner surface of the black plate will be completely covered by the solder and the lacquer. The lithographed coating and the lacquer coating are preferably so placed that the outside of the finished can body and into the entrance of the side seam is lithographed, and the inside of the can body in the region of the side seam extending all the way around the base of the inner hook is lacquered. At the same time, there is left exposed on both faces of the hooks and the portions of the body blank supporting the hooks which are within the limits of the side seam, coatings of solder which are brought into contact so that when heat is applied the solder will melt and form a bond for the side seam.

Referring more in detail to the drawing, in Figure 1 is shown a sheet of metal indicated at 1, which as noted above, may be an uncoated black plate, or a black plate which has been coated with tin or other metal. The line $a, a$ indicates where the sheet is to be cut when it is desired to produce body blanks from the sheet. The lines $b, b$ indicate where the sheet is to be cut in order to produce individual blanks of a size so that each blank will produce a can body. The metal sheet 1 is first subjected to suitable fluxing and solder applying devices for forming a solder strip 2 all the way across the sheet at one side thereof; a solder strip 3 all the way across the sheet intermediate the ends thereof, and a solder strip 4 all the way across the sheet at the other side thereof. This face to which these strips of solder are applied is the face of the body blank which is to constitute the outer surface of the can body.

In Figure 3, the opposite side of the sheet 1 is shown. This is the side which is to constitute the inner face of the can bodies. Solder strips 6a, 9 and 10 are applied to this sheet by suitable fluxing and solder applying devices. The individual blanks are indicated by the light lines in Figures 2 and 3, and it will be noted that when the sheet is cut, there will be strips of solder on the inner and outer faces of the edge portions of each blank which are to be united in the forming of the side seam.

In Figure 4 of the drawing, the sheet 1 is shown as having been subjected to any suitable lithographing means for the decorating and finish coating of the same. It is noted that the edge of the strip 2 of solder which is indicated at c, c, is more or less uneven. This is necessarily so, as it is difficult to coat with solder a metal sheet to a fixed line. This solder strip 2 is slightly wider than the edge portions which are to be formed into the inner hook 5 and the body portion of the metal supporting the hook, and located within the limits of the side seam. The lithographed coating indicated at 7 in Figure 4, extends to the line d, d, and thus overlaps the solder strip to a slight extent. The line d, d can be determined with accuracy. This line d, d is so placed that there is sufficient solder exposed on the strip 2 so as to produce the desired solder bond for the side seam. As shown in the drawing, the lithographing of the outer face is so disposed that it terminates substantially at the point 7a which is inside of the seam sufficiently so as to cover all of the outer surface of the can body. The solder strip 2 is of such width that it covers the outer face of the body wall carrying the hook 5 and the inner face of the hook in the region of the side seam. The lithographed coating 7 extends on to the solder strip 3 so as to leave exposed the strip 3a at the end of each body blank. This strip 3a extends from the end of the hook 6 substantially to the base of the hook, terminating so that the lithographed coating 7 extends around the base of said hook into the side seam as shown in Figure 8.

The body blanks formed from the lower half of the sheet as viewed in Figures 2 and 4, will have a solder strip 3b similar in width to the strip 2, and an exposed solder strip 4 similar in width to the exposed solder strip 3a.

The other side of the body blank 1 is coated with lacquer which is indicated at 8 in Figure 5 of the drawing. The solder strip 6a is covered with a lacquer so as to leave exposed portions 6b only, which exposed portions form the outer face of the inner hook 5. At the ends of the hooks are the usual lap portions in the side seam, which are solder bonded together and provide two thicknesses of metal only to facilitate the flanging of the can bodies for securing can ends thereto. It is desired that the inner face of the lap portion 5a associated with this inner hook 5 be lacquered, and that the outer face of the lap portion 5a be coated with solder. The reason for this is to provide a coating of solder between the lap sections for solder bonding the same and a coating of lacquer covering the exposed inner face of the lap sections. It will be noted from Figure 5 that the lacquer covers these lap sections just referred to, leaving exposed the solder at 6b, which extends only the length of the hook.

The lacquer coating 8 extends on to the strip section 9a of the solder strip 9 and leaves exposed a strip of solder which covers the outer face of the outer hook 6 and the inner face of the body within the limits of the seam which supports said outer hook. When the hooks are interlocked and bumped, the lacquer coating 8 covers the inner surface of the can body and extends a very slight distance into the side seam to the point 8a, and the inner face of the metal of the blank which is within the limits of the side seam, has strips of solder applied thereto. After the parts have been interlocked as shown in Figure 8, and bumped, then heat is applied preferably to the inside of the can body, and this melts the solder and brings about a solder bonding of the side seam. The lacquer coating covering the inside of the body blanks is of such a character that it will withstand the heat necessary for the melting of the solder.

The series of blanks at the lower side of the sheet as viewed in Figure 5, has exposed portions of solder 9b similar to the exposed portions 6b, and a solder strip 10a which is similar to the solder strip 9a.

It will be understood that from certain aspects of the invention, the lithographed surface may terminate short of the side seam, but it is essential that it shall lap on to the solder strip so that the outer surface of the black sheet will be completely covered by the lithographing and the solder coating. The same is true of the inner surface of the can body. The lacquer may terminate short of the side seam, but again it is essential that the lacquer shall lap on to the solder coating so as to insure the complete covering of the inner face of the black sheet. As noted above, it is difficult to obtain any clear line of limits to the solder coating, but the limits of the lithographing or the lacquering may be defined, and therefore, the finish surface will be free from ragged outlines. It is also obvious that the solder coating need not be applied to all parts of the side seam which are to be bonded together, but there should be a sufficient amount of solder applied to the blank so as to completely solder bond the side seam. It is preferable to apply the solder coating to the sheet before it is cut into blanks and to lithograph and lacquer the sheet before it is cut into blanks, notched and edged for forming the side seam of the can body, as this greatly saves in the expense. It is obvious, however, that the solder strips and the lithographing and lacquering may be applied to the individual blanks without departing from the spirit of the invention as set forth in the appended claim.

While the word "strip" is used to define the solder attached to the sheet, it is understood of course that the solder is not made into a strip before it is formed; it is applied to the sheet and after it is applied it forms a strip of solder.

Having thus described the invention, what I claim as new and desire to secure by Letters Patent, is—

A can blank comprising a sheet of black plate coated with solder along those parallel margins which constitute the side seam portions, the black plate between the solder-coated side seam portions being coated with a non-metallic coating which exteriorly overlaps the solder coatings throughout the length of the side seam portions, the limits of the non-metallic coating being defined by straight lines.

ALFRED L. KRONQUEST.